(12) United States Patent  
Wang et al.

(10) Patent No.: US 7,856,047 B2
(45) Date of Patent: Dec. 21, 2010

(54) SYSTEM AND METHOD FOR CONCURRENT FREQUENCY HOPPING OF RADIO COMMUNICATIONS

(75) Inventors: Yijun Wang, Syosset, NY (US); Kenneth G. Eskildsen, Great Neck, NY (US)

(73) Assignee: Honeywell International Inc., Morristown, NJ (US)

( * ) Notice: Subject to any disclaimer, the term of this patent is extended or adjusted under 35 U.S.C. 154(b) by 726 days.

(21) Appl. No.: 11/859,355

(22) Filed: Sep. 21, 2007

(65) Prior Publication Data

US 2009/0080497 A1 Mar. 26, 2009

(51) Int. Cl.
*H04B 1/00* (2006.01)
(52) U.S. Cl. ....................................................... 375/132
(58) Field of Classification Search ................... 375/132
See application file for complete search history.

(56) References Cited

U.S. PATENT DOCUMENTS

| | | | | |
|---|---|---|---|---|
| 5,142,534 | A * | 8/1992 | Simpson et al. | 370/330 |
| 5,696,903 | A * | 12/1997 | Mahany | 709/228 |
| 6,757,523 | B2 * | 6/2004 | Fry | 455/78 |
| 7,035,313 | B2 * | 4/2006 | Fry | 375/132 |
| 7,103,030 | B2 | 9/2006 | Jones | |
| 7,116,699 | B2 | 10/2006 | Batra et al. | |
| 7,116,700 | B1 | 10/2006 | Sivakumar | |
| 7,116,938 | B2 | 10/2006 | Monroe et al. | |
| 7,151,767 | B2 | 12/2006 | Spencer et al. | |
| 7,164,664 | B2 | 1/2007 | Duran et al. | |
| 7,177,287 | B1 | 2/2007 | Herring et al. | |
| 7,599,703 | B2 * | 10/2009 | Derks et al. | 455/518 |
| 7,676,198 | B2 * | 3/2010 | Mahany | 455/69 |
| 7,684,784 | B2 * | 3/2010 | Parthasarathy | 455/410 |
| 7,688,811 | B2 * | 3/2010 | Kubler et al. | 370/356 |
| 2007/0066311 | A1 * | 3/2007 | Reibel et al. | 455/445 |
| 2008/0310311 | A1 * | 12/2008 | Flammer et al. | 370/238 |

* cited by examiner

*Primary Examiner*—Juan A Torres
(74) *Attorney, Agent, or Firm*—Husch Blackwell LLP; Welsh Katz

(57) ABSTRACT

A method and system for selecting frequency channels for a concurrent dual transceiver system are provided. In one aspect, a single hop table for at least two transceivers is used. The single hop table tracks information associated with a plurality of frequency channels that the transceivers can use. An available frequency channel is randomly selected using the single hop table and a transceiver is allowed to communicate via the selected frequency channel for allowed time duration. If communication has not completed for the current communication request, another frequency channel that is available is selected randomly and used. Multiple transceivers may communicate concurrently using this frequency channel selection and hopping method.

25 Claims, 14 Drawing Sheets

SYSTEM AND METHOD FOR CONCURRENT FREQUENCY HOPPING OF RADIO COMMUNICATIONS

FIELD OF THE INVENTION

The present disclosure relates to radio frequency communications, and particularly to wireless communication and topology, for instance, used in security and/or alarm systems.

BACKGROUND OF THE INVENTION

Current products used in many residential homes as part of security alarms systems wirelessly connect door and/or window sensors with a control panel in one installation through a radio frequency (RF) receiver. These sensors and RF receivers operate on 315-345 MHz frequency band. A drawback associated with the products that operate on 315-345 MHz frequency band is the limited amount of data that can be transferred. For instance, Federal Communications Commission (FCC) regulations allow only a set amount of data to be transferred on 315-345 MHz frequency band, thus limiting the fill capacity of the existing products. In addition, in order to comply with the FCC regulations, only a fraction of the transmit power of a transmitter inside the sensors is used. As a result, the communication range between the sensors and the receiver is limited.

Further, current products are based on star topology, which limits the geographical area that can be covered wirelessly. In star topology, there is only a single RF link between a sensor and the RF receiver. A failure in that single RF link means losing communication between the sensor and the RF receiver. In addition, products utilizing such star topology configuration cannot support multiple buildings or multiple floors of the same building. These limitations preclude the option of using the products in residential environments that require large coverage and longer communication range. The products also are not suitable for deploying in commercial environment, which usually also need longer communication range from sensors to RF receivers. Further, as mentioned above, due to FCC regulations, such existing products are not able to transfer large amount of data to control panel, such as video, audio and picture data as is required in some applications. FCC regulations also have limitations on the number of frequency channels according to transmit power levels.

BRIEF SUMMARY OF THE INVENTION

A method and system for selecting frequency channels for a concurrent dual transceiver system are provided. In one aspect, a single hop table for at least two transceivers is used. The single hop table tracks information associated with a plurality of frequency channels that the transceivers can use. An available frequency channel is randomly selected from the single hop table and a transceiver is allowed to communicate via the selected frequency channel for allowed time duration. If communication has not completed for the current communication request, another frequency channel that is available is selected randomly and used. Multiple transceivers may communicate concurrently using this frequency channel selection method. The method and system may be utilized in an alarm and/or security system in home and/or commercial environment. The system may be configured in a network of devices structured as a tree topology or mesh topology or combination of both.

A method for selecting frequency channels for a concurrent dual transceiver system, in one aspect, may comprise establishing at least a first transceiver and a second transceiver for communicating concurrently; establishing a single hop table for the first transceiver and the second transceiver, the single hop table tracking information associated with a plurality of channels; selecting randomly an available channel from the single hop table; and using the selected available channel for allowed time duration.

A method for selecting frequency channels for a concurrent dual transceiver system, in another aspect, may comprise selecting randomly a channel from a plurality of channels; determining if the selected channel is busy, and if the selected channel is busy, repeating the selecting step and the determining step to select a next channel that is available; marking the selected channel as busy and starting one or more timers associated with the selected channel; performing data signal transfers on the selected channel until said one or more timers associated with the selected channel expire; and resetting said one or more timers associated with the selected channel.

In another aspect, a method for selecting and scheduling frequency channel hopping for two or more transceivers is provided in which the method may comprise establishing two or more transceivers in one communication system; storing a plurality of communication requests for said two or more transceivers in a communication request queue; storing a common hop table having information associated with a plurality of channels for said two or more transceivers; obtaining a communication request to serve from the communication request queue; identifying a transceiver to use for the communication request; using the common hop table to determine an available channel to use for the transceiver; while the transceiver is performing communication associated with the communication request, obtaining a second communication request to serve from the communication request queue; identifying a second transceiver to use for the second communication request; and using the common hop table to determine an available channel to use for the second transceiver, wherein said two or more transceivers can be served concurrently and each channel in the common hop table can be shared concurrently within a period time among the said two or more transceivers and said two or more transceivers perform frequency hopping in parallel among the plurality of channels specified in the common hop table.

Yet in another aspect, a method for selecting and scheduling frequency channel hopping for two or more transceivers is provided in which the method may comprise establishing at least a first transceiver and a second transceiver for communicating concurrently; establishing a single hop table for the first transceiver and the second transceiver, the single hop table tracking information associated with a plurality of channels; selecting randomly an available channel from the single hop table; using the selected available channel for allowed time duration; and repeating the steps of selecting and using until data transfer is completed for current communication request, wherein the steps of selecting, using, and repeating are performed for communication requests on the first transceiver and the second transceiver concurrently.

A concurrent frequency hopping system, in one aspect, may comprise a processor; at least two radio frequency transceivers connected to the processor; and a hop table including at least information associated with a plurality of channels that the two radio frequency transceivers use. The processor is operable to select a transceiver for serving a communication request, the processor is further operable to randomly select an available channel from the hop table and allow the selected transceiver to communicate via the selected channel for an allotted duration associated with the selected channel.

A concurrent frequency hopping system, in another aspect, may comprise a plurality of nodes comprising at least a processor, two radio frequency transceivers, and a hop table including at least information associated with a plurality of channels the two radio frequency transceivers use. The processor is operable to select a transceiver for serving a communication request. The processor is further operable to randomly select an available channel from the hop table and allow the selected transceiver to communicate via the selected channel for an allotted duration associated with the selected channel. The processor may be further operable to repeat randomly selecting and allowing communication on a randomly selected channel if more communications is needed to serve the communication request. A plurality of sensor devices and/or peripheral devices communicates with a control device, for instance, using the plurality of nodes.

In another aspect, a system for selecting and scheduling frequency channel hopping for two or more transceivers is provided. The system may comprise at least two radio frequency transceivers and a processor connected to said at least two radio frequency transceivers. A common hop table is stored at the processor and includes at least information associated with a plurality of channels. The processor is operable to control said at least two radio frequency transceivers and to process two or more communication requests concurrently for said at least two radio frequency transceivers by selecting randomly an available channel from the common hop table for a first transceiver of said at least two radio frequency transceivers and while allowing the first transceiver to perform communications, selecting randomly an available channel from the common hop table for a second transceiver of said at least two radio frequency transceivers, and allowing said second transceiver to perform communications.

Said two or more transceivers are capable of transmitting and receiving data independently.

A program storage device readable by a machine, tangibly embodying a program of instructions executable by the machine to perform above method steps may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
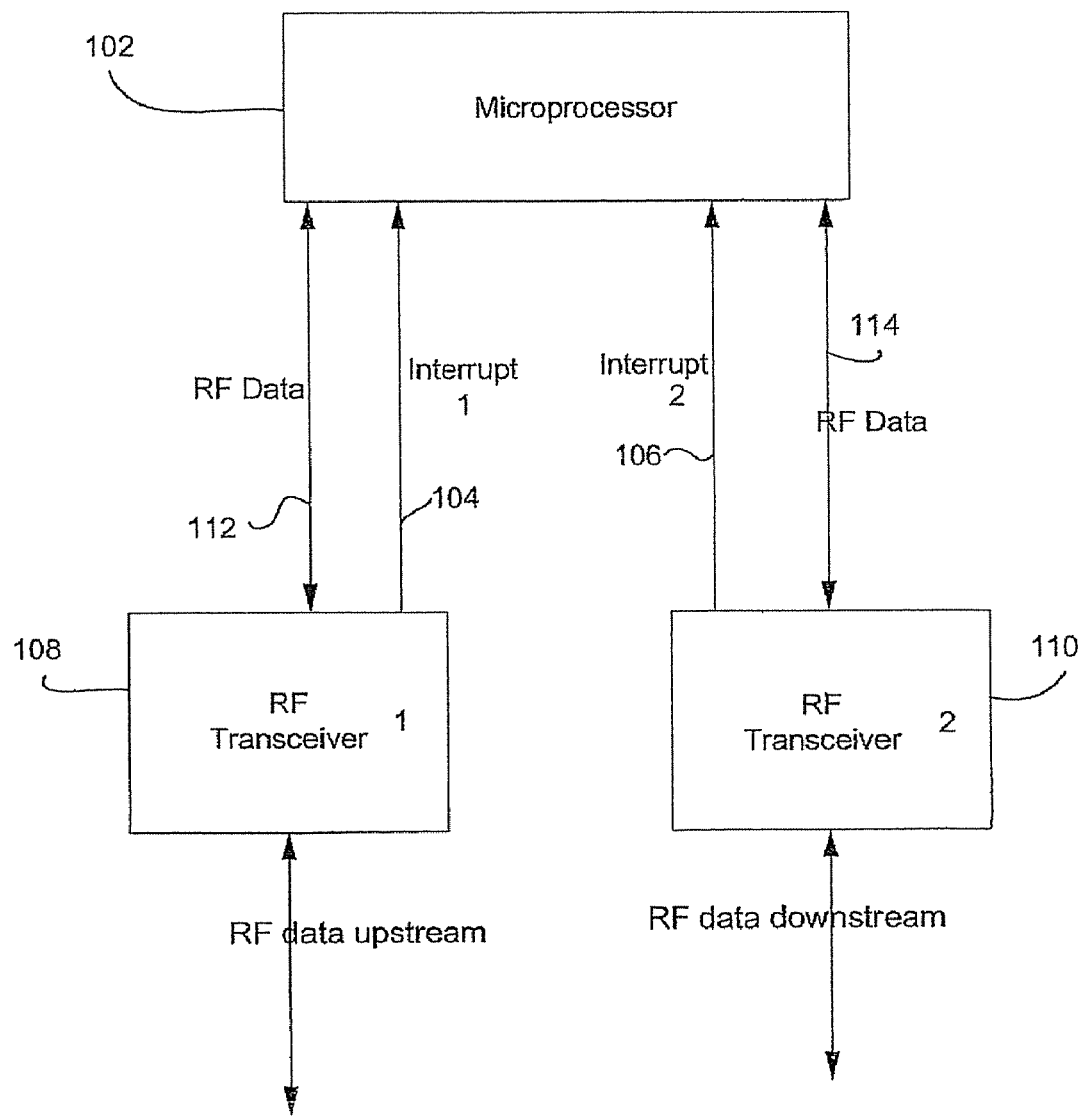
FIG. 1 illustrates a communication system of dual transceivers in one embodiment of the present disclosure.

A wireless communication system is created as a relay in a tree topology or a router in a mesh topology for industrial, scientific, and medical (ISM) band 902-928 MHz in one embodiment. This system in one embodiment utilizes two parallel RF transceivers and novel concurrent FHSS (frequency-hopping spread spectrum) method to handle different RF communications streams simultaneously under FCC regulations. More than two RF transceivers may be used in parallel in a system.

A tree or mesh network topology of the present disclosure may provide a global wireless platform and may be also used in Europe at the frequency bands of 868 MHz and 902-928 MHz in United States. The wireless communication system of the present disclosure may be used in a security and/or alarm system between a control, panel and peripheral devices, such as keypads, RF receivers and sensors, both in residential and commercial environments.

The tree or mesh network topology extends the range between a control panel and peripheral devices and also provides redundant communication paths among devices in case of any radio link failure. Using such topologies, a wireless security and/or alarm network that covers longer distance and larger geographical areas can be built.

In a tree structure or mesh network, a relay node is considered as a device which communicates with both a parent device (upstream communication) and child devices (downstream communication). In one embodiment, the wireless communication system, also referred to as a global wireless platform in the present disclosure utilizes two RF transceivers to build a relay node and uses novel frequency hopping algorithm. It is possible to have more than two RF transceivers. Similarly, a router node may be used in a mesh network. This router node may be also built with two or more RF transceivers in one embodiment of the present disclosure, where the novel frequency hopping method may be used to handle multiple streams of RF communications.

In this disclosure, four different usage scenarios are described to illustrate the use of the global wireless platform of the present disclosure: residential multiple floors coverage that use relay with tree topology; multiple buildings installation that use relays with tree topology; commercial warehouse installation with extended range that use relay with tree topology; mesh in multiple office areas that use routers with mesh topology. Other uses are possible.

FCC regulates FHSS systems on the number of channels and transmit power levels. According to FCC part 15.247, FHSS systems are limited to frequency hopping and digitally modulated intentional radiators; channel carrier frequencies are separated by a minimum of 25 kHz or the 20 dB bandwidth of the hopping channel, whichever is greater; they must have a pseudo-randomly ordered list of hopping frequencies; each frequency must be used equally on the average by each transmitter; the system receivers shall have input bandwidths that match the hopping channel bandwidths of their corresponding transmitters and shall shift frequencies in synchronization with the transmitted signals; if the 20 dB bandwidth of the hopping channel is less than 250 kHz, the system shall use at least 50 hopping frequencies and the average time of occupancy on any frequency shall not be greater than 0.4 seconds within a 20 second period; if the 20 dB bandwidth of the hopping channel is 250 kHz or greater, the system shall use at least 25 hopping frequencies and the average time of occupancy on any frequency shall not be greater than 0.4 seconds within a 10 second period. The maximum peak output power shall not exceed the following: 1 watt for systems employing at least 50 hopping channels, 0.25 watts for systems with at least 25 and less than 50 hopping channels.

While the above relates to 902-928 MHz ISM bands, the methods can be applied in other frequency bands where frequency hopping is used. Without the concurrent frequency hopping method in this disclosure, using dual transceivers within one FHSS may create channel collisions when both transceivers are performing frequency hopping because of limited channel numbers. As a whole, the system has to utilize all the channels from the hopping table uniformly over the time, no matter which transceiver used the channel.

If one were to use one hop table for each RF transceiver, the channel usage over all channels might not be uniformly distributed because two RF transceivers may not have the same or similar amount data to transfer, One RF transceiver may utilize frequency channels from its hop table more often. The other transceiver's hop table channels may be used less often. Therefore, the utilization of all the channels is not equally distributed from a complete system point of view. Further, each RF transceiver may behave as a FHSS device on its own.

FIG. 1 is a hardware block diagram illustrating dual transceiver system of the present disclosure in one embodiment. In FIG. 1, one microprocessor 102 is used in the dual transceiver system. Two interrupts lines 104, 106 from RF transceivers 108, 110 are connected directly to the microprocessor 102. Two separate RF data paths 112, 114 are also connected to microprocessor 102 from RF transceivers 108, 110. This block diagram is used by the system that is acting as a relay or router node. Other regular devices, such as control panel device or peripheral devices may use single transceiver hardware.

In one embodiment, mechanism such as control software or like executing in the microprocessor 102 performs concurrent frequency hopping algorithm. Control software in one embodiment maintains a Communication Request Queue (CRQ), in which each entry is a request for transmission using the selected RF transceiver 1 (108) or 2 (110). The selection of transceivers depends on the direction of communication streams, either up stream or downstream. In the example illustrated, transceiver 1 (108) is used for upstream communication, while transceiver 2 (110) is used for downstream communication.

Figure 2:
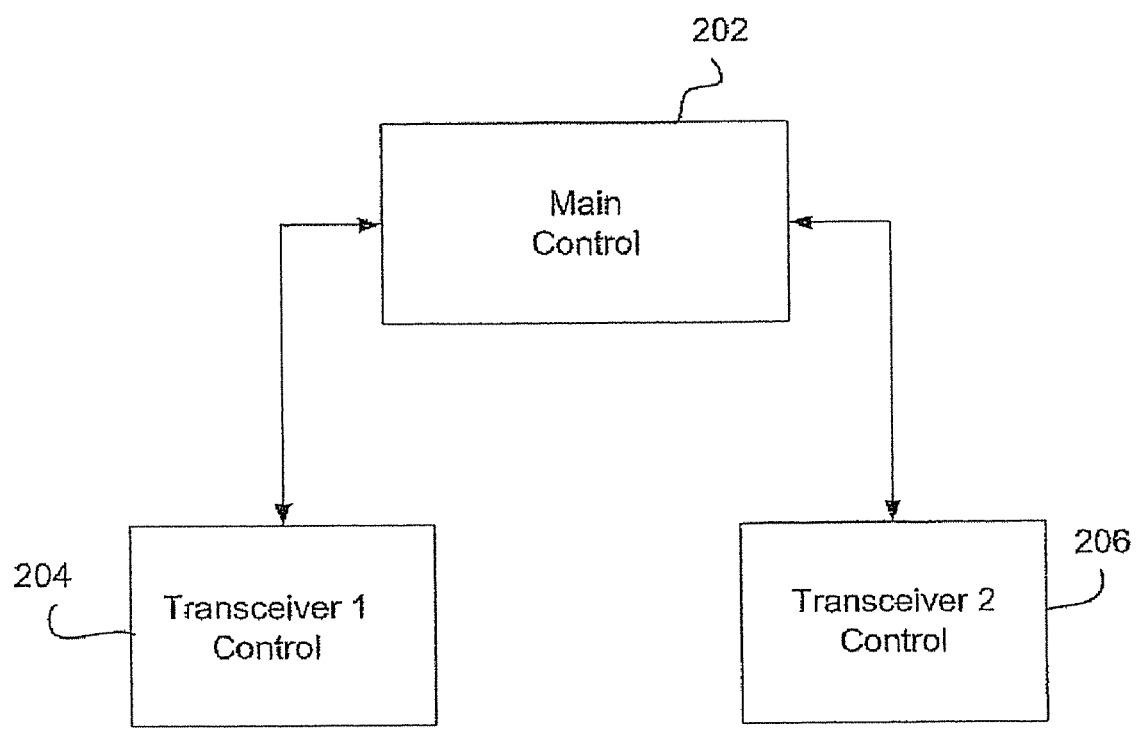
FIG. 2 is a block diagram illustrating control software in one embodiment of the present disclosure.

FIG. 2 is a block diagram illustrating control software or like in one embodiment of the present disclosure. The main control 202 selects either transceiver 1 control 204 or transceiver 2 control 206, for instance, depending on the direction of communication stream. A microprocessor, for example, shown in FIG. 1 at 102, executes the functionalities of the main control 202, transceiver 1 control 204 and transceiver 2 control 206. Those modules may be implemented as a real-time multitasking software and reside in one microprocessor for dual transceivers.

Table 1 defines CRQ in one embodiment.

TABLE 1

Communication Request Queue

| Request Number | Bytes to Transfer | Transceiver Number | Status |
|---|---|---|---|
| 1 | 12 | 1 | Serving |
| 2 | 34 | 2 | Not served |
| 3 | 45 | 1 | Not served |
| ... | ... | ... | ... |

CRQ may be implemented as a queue. In this example, CRQ is a FIFO (first in first out) queue, Once a request is served, it can be removed from the queue. Each communication request is referred as "CR". Each CR may be described with attributes, for example, {Request number, Data bytes, Transceiver number}. In an example scenario, when the control panel, for example, of an alarm system wants to send a message to a sensor such as a window sensor of the alarm system, the control panel may create the request CR shown in the second row of Table 1, as {2, 34, 2}. In that example, 34 bytes of data are to be transmitted by transceiver 2, which is handling downstream data stream. Status is marked as "not served" initially when the request is created.

Concurrent frequency hopping method for dual transceivers of the present disclosure is now described in one embodiment. In one embodiment, as an example only, the method uses 50 channels for a hop table, e.g., from $ch_1$, $ch_2$, ..., to $ch_{50}$. The channel space between $ch_i$ and $ch_{i+1}$ is 25 kHz or larger in this example. There are two timers associated with each channel: T_dwell timer, and T_p timer. T_dwell timer refers to 0.4 second channel dwell time. T_p timer refers to the 10 seconds or 20 seconds period time. Each channel can be used only for T_dwell within every T_p period of time according to FCC rules. Table 2 illustrates a hop table of the present disclosure in one embodiment.

TABLE 2

Concurrent Frequency Hop Table

| Channel Numbers | Busy | T_dwell Expire | T_p expire | Transceiver Number |
|---|---|---|---|---|
| Ch 1 | | | | |
| Ch 2 | | | | |
| Ch 3 | | | | |
| ... | | | | |
| Ch 50 | | | | |

In the table, if a channel is currently used by transceiver x, it will be marked as 'x' in the "Transceiver Number" column; the method of the present disclosure in one embodiment uses this column to keep track of multiple transceivers. If T_dwell expires for chi, then the column "T_dwell" for the corresponding row of chi will be marked as "1". If T_p expires for chi, then the column "T_p" will be marked as "1".

Figure 3:
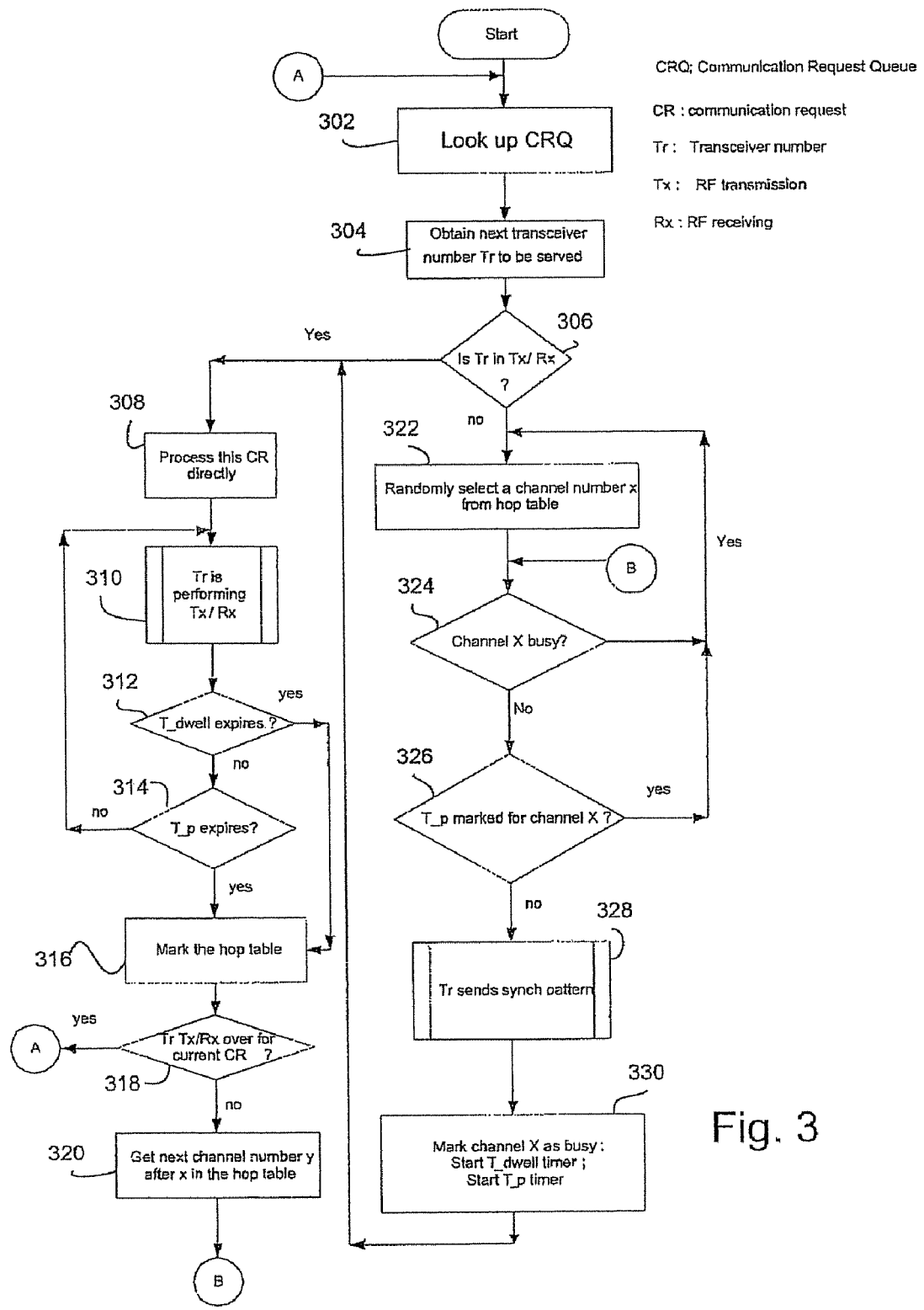
FIG. 3 illustrates concurrent FHSS algorithm in one embodiment of the present disclosure.

FIG. 3 illustrates concurrent FHSS algorithm in one embodiment of the present disclosure. At 302, a lookup is performed in a communication request queue, for instance, as shown in Table 1. From the queue, next transceiver number Tr to be served is obtained at 304, for instance, using the status column. At 306, it is determined if the Tr is in transmission or receipt (Tx/Rx) mode. If Tr is in Tx/Rx, this communication request is processed directly. For instance, if Tr is in Tx/Rx, it means that this Tr is using a channel. After current Tx/Rx is completed, the Tr can start processing this CR in 308 of FIG. 3. If current Tr is not in Tx/Rx, it needs to start acquiring a channel in order to communicate with another device, shown at 322. At 310, Tr is performing Tx/Rx. At 312 it is determined if T_dwell has expired. If T_dwell has expired, the status of expiration is marked at a hop table 316, for instance, as shown and described in Table 2. If T_dwell has not expired, the method proceeds to step 314 to determine if T_p has expired. If T_p has not expired, the method continues to 310 where the Tr continues to transmit or receive. If at 314, it was determined that T_p has expired, the method proceeds to step 316 and the hop table is marked for T_p timer. At 318, it is determined whether the Tr has completed its transmission or receipt associated with the current communication request (CR). If the Tr has not completed the transmission or receipt, the method proceeds to step 320. At 320, next channel number y after x in the hop table is acquired and the method continues to step 324. At 318, if this Tr has completed its transmission or receipt for the current communication request, the method returns to step 302.

At 306, if it is determined that the Tr is not in Tx/Rx, at 322, a channel number x is randomly selected from the hop table. At 324, it is determined whether the selected channel is busy. If the channel is busy, the method selects another channel at 322. If the selected channel is not busy, then at 326, it is determined whether T_p timer is marked in the hop table for channel x. A marked T_p timer indicates that this channel is not to be used at this time. For instance, FCC allows each channel to be used only for 0.4s for every T_p timer. If one channel has been busy for 0.4s within T_p timer, then this channel cannot be used anymore until another T_p timer cycle. Thus, T_p is marked as expired. The step at 326 checks whether this is the case even though this channel is currently determined as not being busy. If T_p is marked, then the method selects another channel at 322. If T_p is not marked, the method proceeds to step 328 and Tr sends synchronization (sync) pattern. Sending a sync pattern allows other devices to acquire a channel before transmitting transceiver and a receiver device can communicate. This procedure is usually called a channel synchronization in FHSS method. In one embodiment of the present disclosure, the novel hopping algorithm and dual transceivers are used in a master device, which initiates channel synchronization. Other receiver devices that wish to communicate with the master device will listen to the sync pattern on all the channels and perform the channel acquisition. Once a device acquires a channel successfully, it will start sending and/or receiving data with the master device. At 330, the selected channel x is marked as busy and timers such as T_dwell and T_p are started. Then the method proceeds to step 308. In one embodiment, the frequency hopping algorithm of the present disclosure may be implemented to use T_dwell as an accumulating counter with a selected threshold value, for example, the maximum value of 0.4s required by FCC, and T_p as an accumulating counter with a selected threshold value, for example, the maximum value of 20 or 10 seconds as required by FCC. This way, each channel usage is more precisely recorded and adds the intelligence of channel selection for the algorithm, allowing all channels to be used evenly throughout the time of communications. The hopping algorithm of the present disclosure in another embodiment may be implemented to use different number of hop channels for two transceivers. For example, transceiver 1 may hop among 25 channels and transceiver 2 may hop among 50 channels in a 50 channel FHSS system.

In one embodiment, transceiver control software 1 and 2 perform channel synchronization and data transmission and/or receive independently with their perspective receiver devices on different channels, which are randomly selected. For example, transceiver 1 can communicate with device 1 on $ch_x$ and transceiver 2 can communicate with device 3 on $ch_y$, device 1 and device 3 are being their perspective receiver devices. These two communications may occur in parallel and independently with each other.

Figure 4:
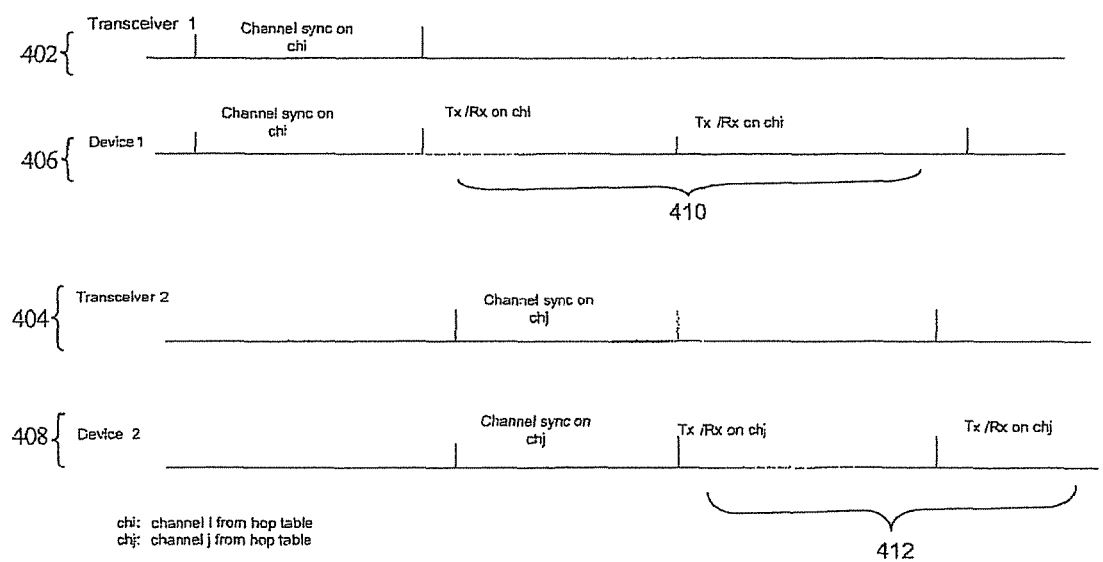
FIG. 4 illustrates a timing diagram of concurrent processing in one embodiment of the present disclosure.

FIG. 4 shows a timing diagram of concurrent processing in one embodiment of the present disclosure. Two separate transceiver control tasks 402, 404 perform channel synchronization with different peripheral devices 406, 408 concurrently, on different channels. RF data transmission and receive 410, 412 can also be concurrent among transceivers once channels are established. A real-time multitasking operating system supports the implementations in one embodiment.

Figure 5:
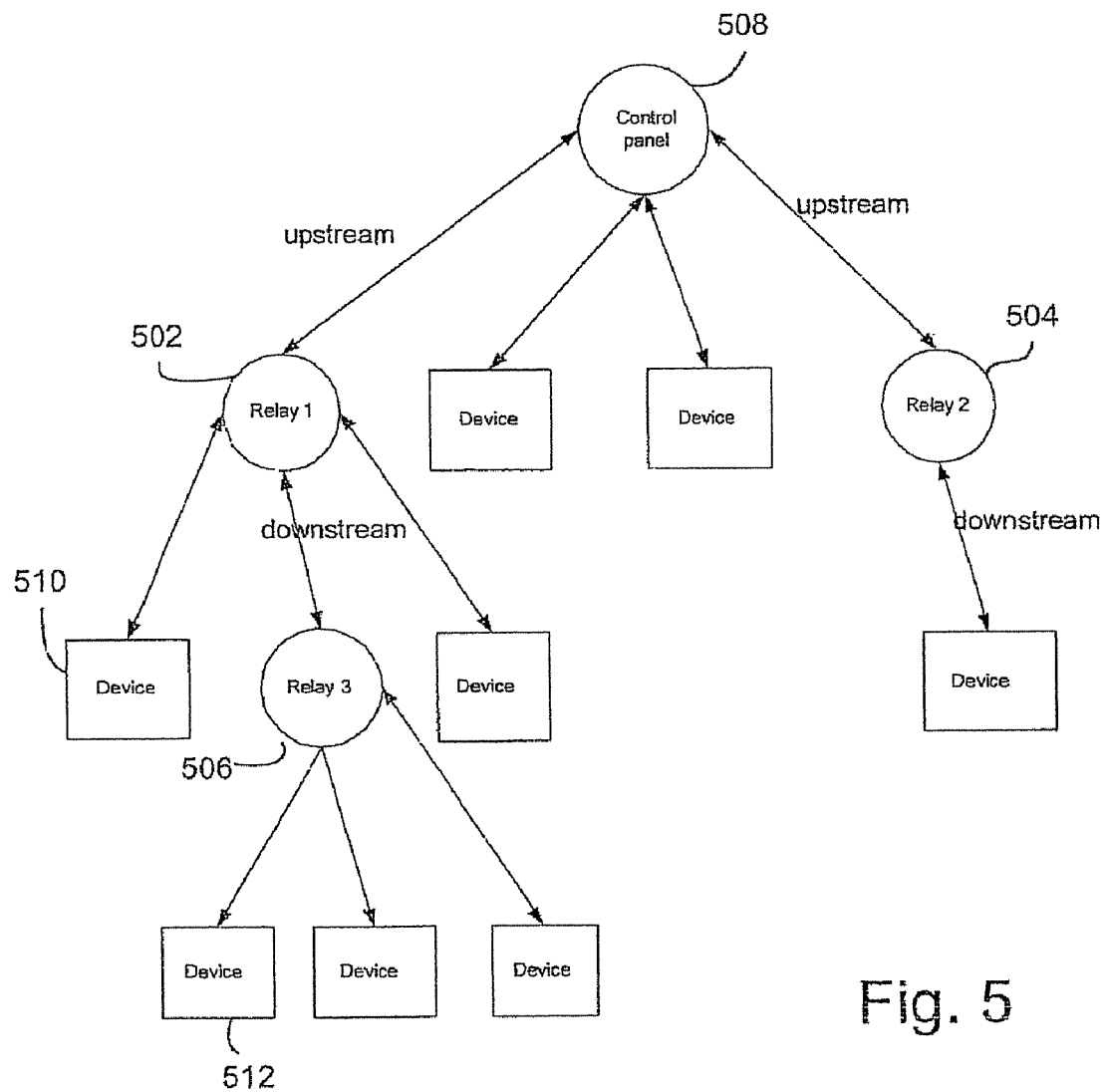
FIG. 5 illustrates relay nodes supporting tree topology in one embodiment of the present disclosure.

FIG. 5 illustrates relay nodes supporting a tree topology. A dual transceiver system and the hopping algorithm described above may be used in the relay nodes. A relay node (e.g., 502, 504, 506) can communicate with both parent and child devices at the same time. In this case, one RF transceiver in the relay node handles upstream communication and another RF transceiver handles downstream communication. For instance, relay node 1 shown at 502 may communicate with a control panel 508 and a device 510 simultaneously. Similarly, rely node 3 at 506 may communicate with relay node 1 at 502 and a device 512 at the same time. Examples of devices may include but are not limited to door and/or window sensors, keypads, and other types of peripheral devices, for instance, used in a security and/or alarm system. A control panel can be any control panel that controls systems such as alarm and/or security systems. Concurrent frequency hopping method described above is used to avoid frequency channel jamming, while maintaining a random channel hop sequence as one system, not two separate transceivers.

Figure 6:
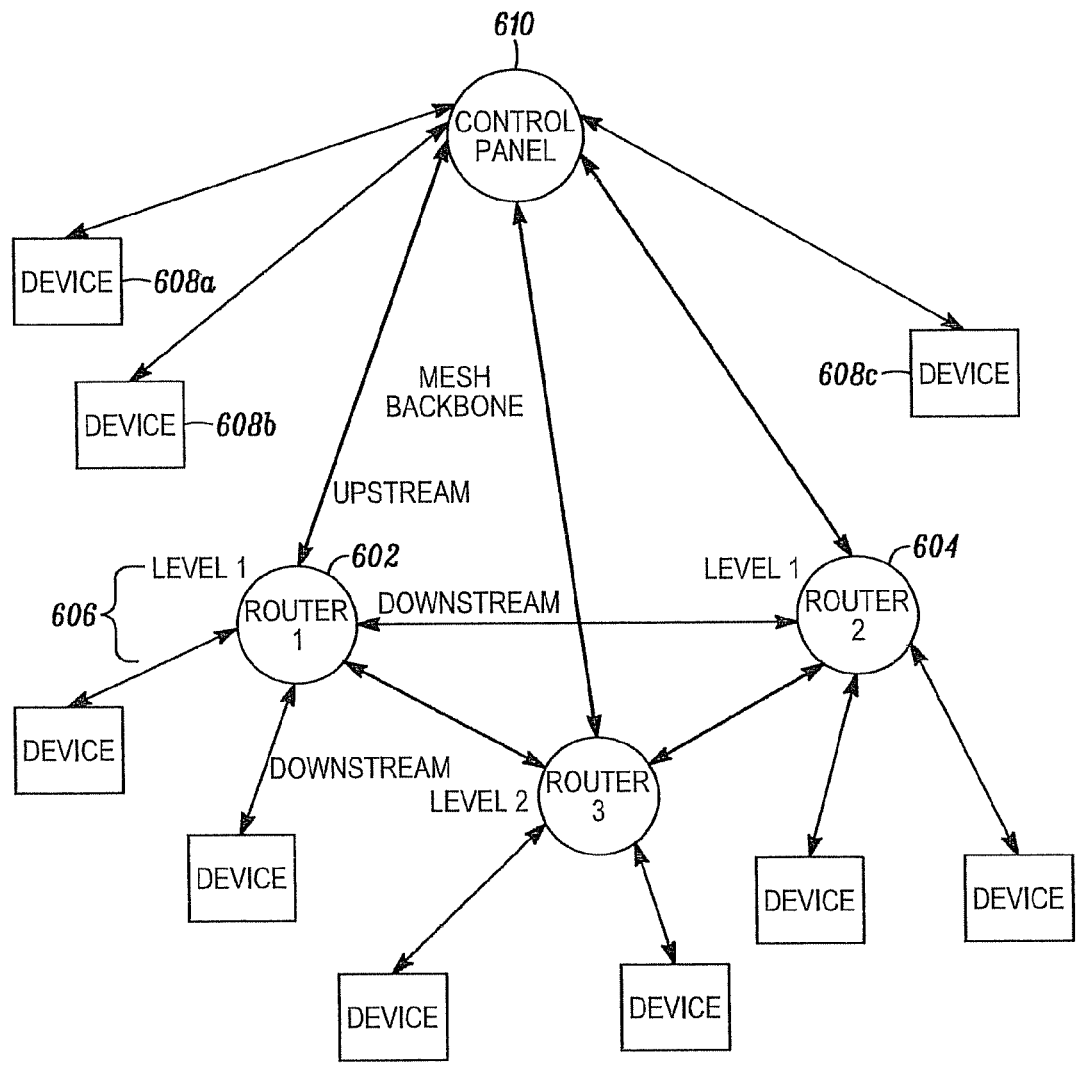
FIG. 6 illustrates router nodes supporting mesh network in one embodiment of the present disclosure.

A dual transceiver system and the hopping algorithm described above may be also used in router nodes. FIG. 6 illustrates router nodes supporting mesh topology in one embodiment of the present disclosure. Devices (608a-608c) may be door and/or window sensors, keypads and other types of peripheral devices used, for example, in a security and/or alarm system. A control panel 610 may be any panel device that allows control and access to the security and/or alarm system. In this example, there are two router nodes 602, 604 on the same level, Level 1 606. The routing topology may follow concurrent processing rules such as:

a) Router 1 and Router 2 communicate with the control panel device using upstream communications, for example, as in the example tree topology explained above.

b) Router 1 and Router 2 communicate with level 2 Router 3 and their child devices using downstream communications.

c) Router 1 and Router 2 communicate using the transceiver for downstream communications. In Router 1 or Router 2, if there are communication requests for both child devices and another router on the same level, (e.g., Router 2 or Router 1), the communication requests of child devices is to be processed first.

Systems using proposed concurrent FHSS methods and dual transceivers systems described above are referred to as concurrent FHSS system. A next generation RE project Global Wireless Platfoini (GWP) may include a tree or mesh network topology using GWP hardware, for example, the dual transceiver system described above. GWP can be used in Europe at the frequency bands of 868 MHz bands and 902-928 MHz in United States. This type of communication device is used in a security and/or alarm system between control panel and peripheral devices, such as keypads, RF receivers and sensors, both in residential and commercial environments.

A tree or mesh network topology is used to extend the range between a control panel and peripheral devices. It also provides redundant communication paths among devices in case of any radio link failure. In such a way, a wireless security and/or alarm network with a tree or mesh network topology can be built in order to cover longer distance and larger geographical areas. In a tree structure or mesh network, a relay node is a device which communicates with both a parent device (upstream communication) and child devices (downstream communication). In one embodiment, two RE transceivers are used to build a relay node, where novel frequency hopping algorithm may be used.

Similarly, one or more router nodes may be used in a mesh network. In one embodiment, a router node is also built with two RF transceivers, and the novel frequency hopping method is used to handle multiple streams of RF communications.

While not limited to such, four different usage scenarios are described to illustrate the method and system of the present disclosure: residential multiple floors coverage-relay with tree topology; multiple buildings installation-relays with tree topology; commercial warehouse installation with extended range-relay with tree topology; and mesh in multiple office areas-routers with mesh topology. Other usage scenarios are possible.

Figure 7:
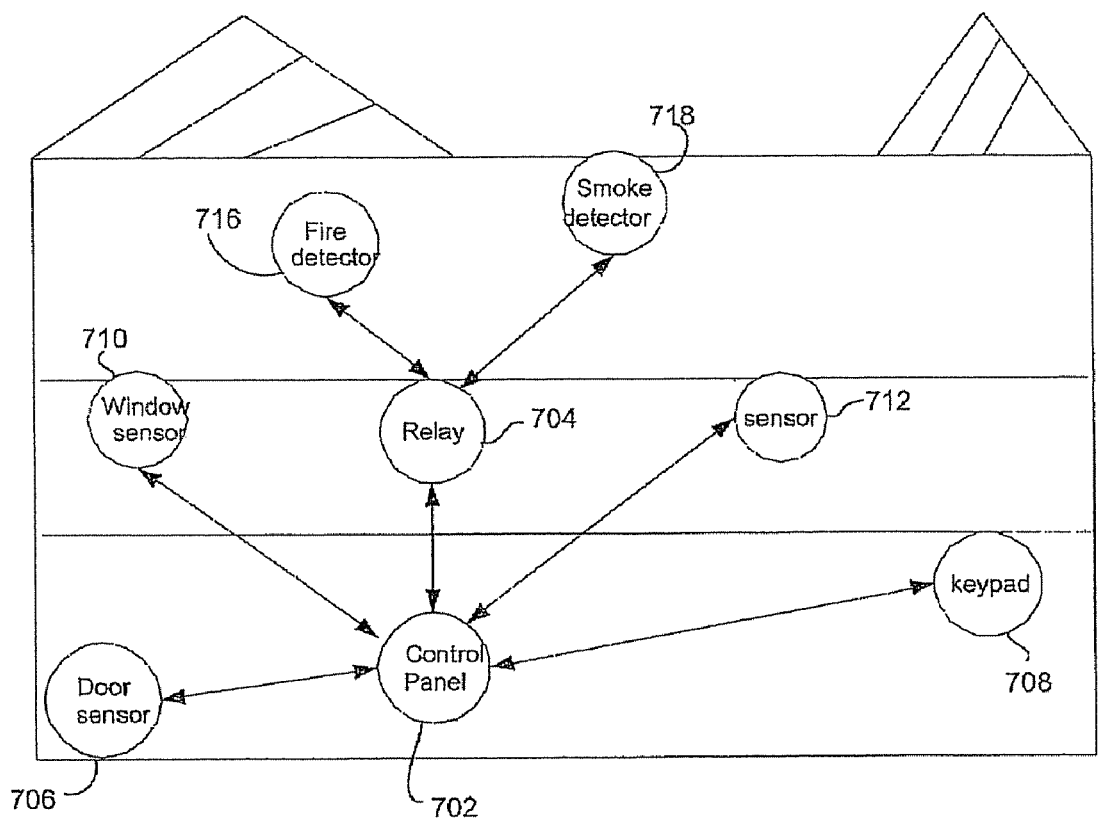
FIG. 7 illustrates multiple floors coverage in one embodiment of the present disclosure.

FIG. 7 illustrates an example usage of a relay system in residential home with multiple floors. The relay nodes are structured in tree topology in this example. A relay node may comprise two RF transceivers and use the frequency hopping algorithm described above. A control panel 702 on the first floor communicates with a relay node 704 on the floor above and also with devices such as a door sensor 706 and keypad 708 on the same floor. The control panel 702 can also communicate with the window sensor 710 and another sensor 712 on the second floor. The relay node 704 communicates with devices on the third floor such as a fire detector 716 and smoke detector 718.

Figure 8:
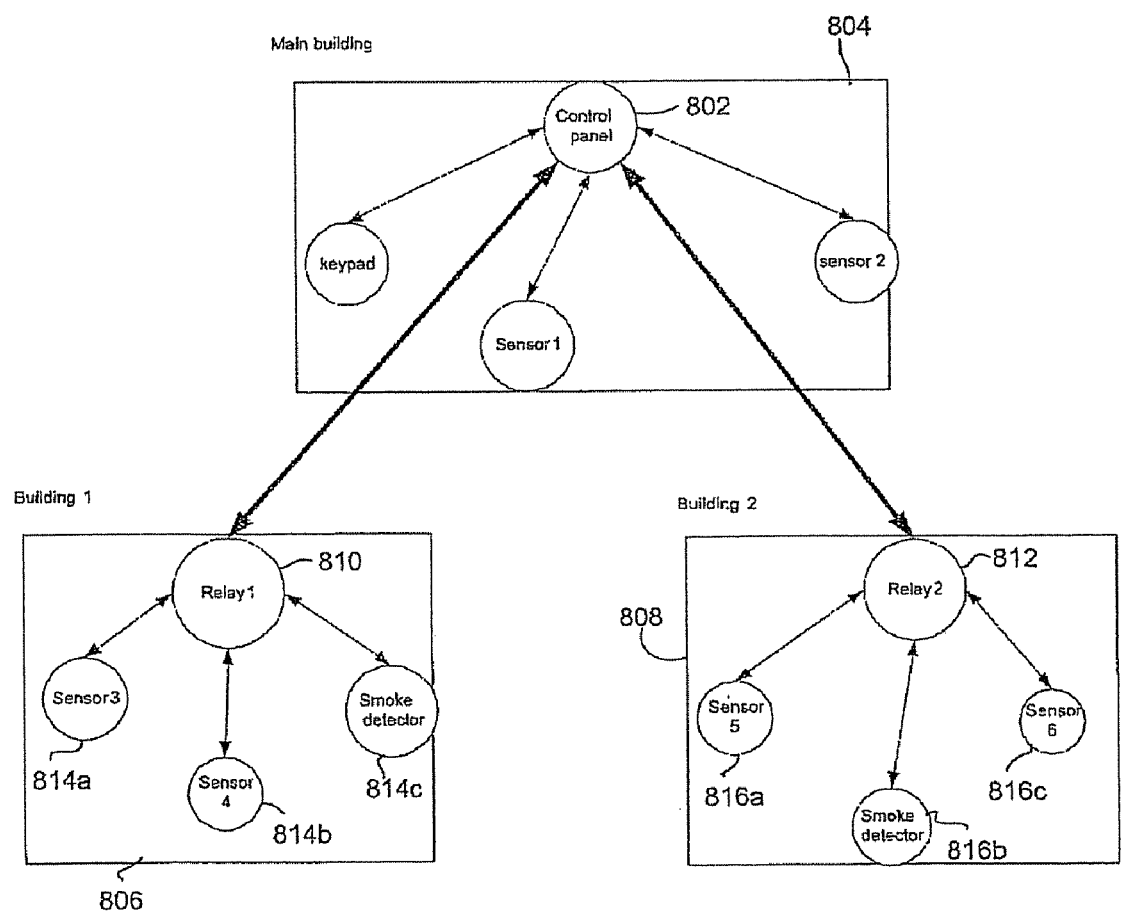
FIG. 8 illustrates multiple buildings coverage in one embodiment of the present disclosure.

FIG. 8 illustrates coverage among multiple buildings using the dual transceiver system and frequency hopping method of the present disclosure. One control panel 802 is installed in main building 804. Each of other buildings 806, 808 has installed in it a relay system 810, 812 and peripheral devices 814a-814c, 816a-816c, for instance, in tree topology.

Figure 9:
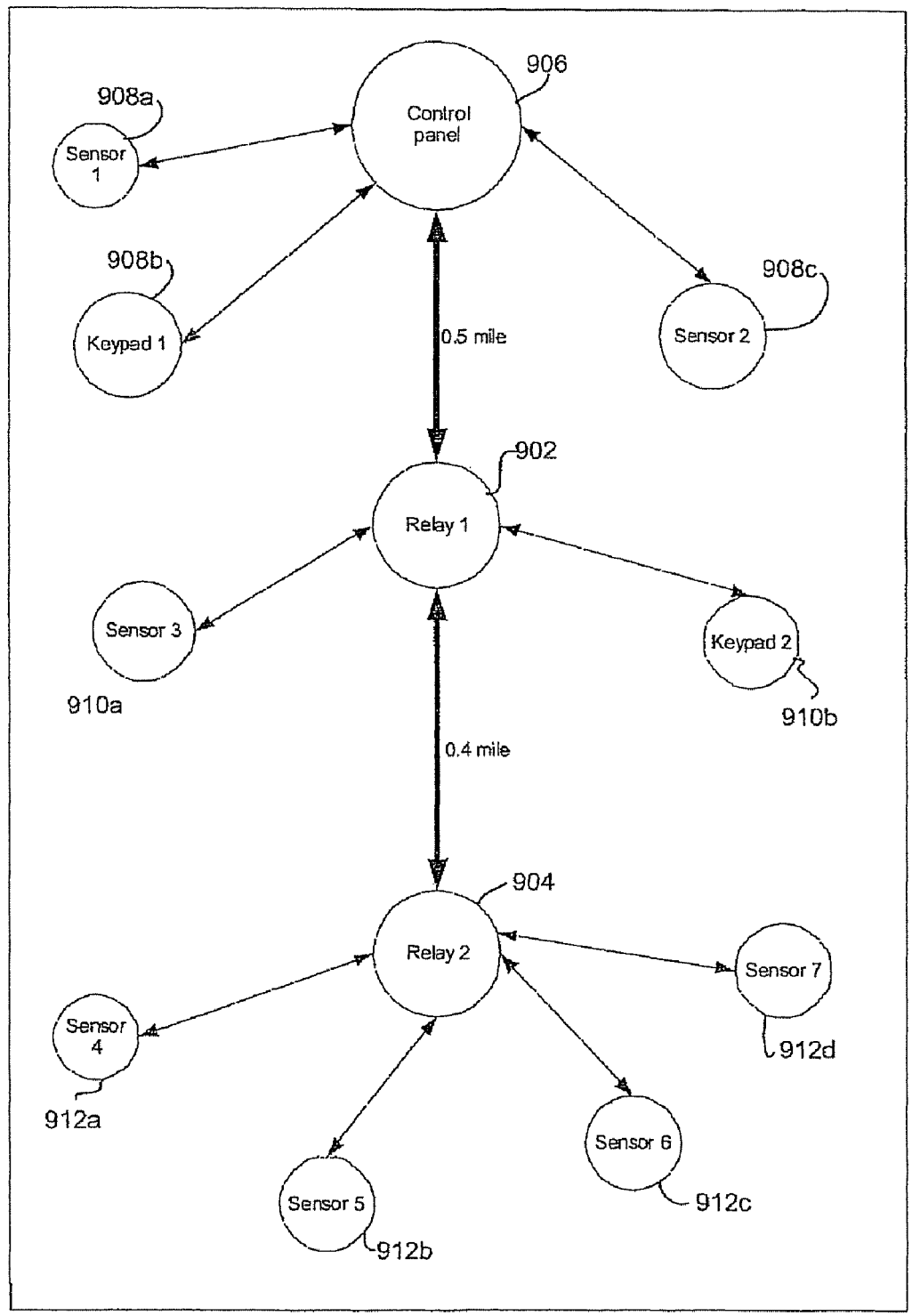
FIG. 9 illustrates commercial warehouse coverage in one embodiment of the present disclosure.

FIG. 9 illustrates coverage in commercial warehouse using the dual transceiver system and frequency hopping method of the present disclosure. In this example, multiple relay systems 902, 904 are connected in series to extend the range in a very large or long commercial warehouse environment. A control panel 906 communicates with a relay node 902 and also directly with various devices 908a-908c. Relay node 902 also communicates with relay node 904 and other devices 910a-910b. Relay node 904 communicates with relay node 902 and various other devices 912a-912d.

Figure 10:
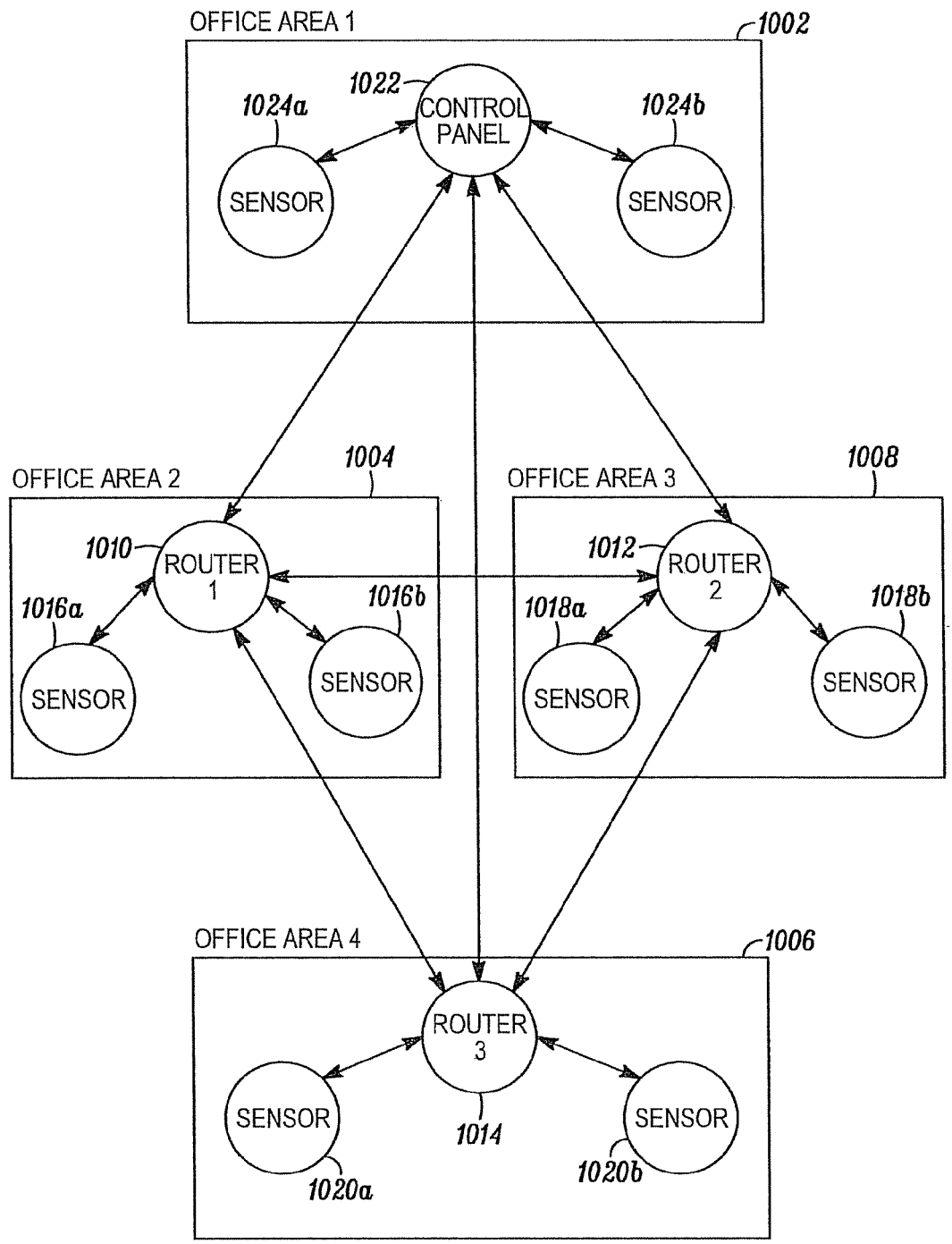
FIG. 10 illustrates mesh network in office areas in one embodiment of the present disclosure.

A router node may be also used in a mesh network. FIG. 10 illustrates a mesh topology network using the dual transceiver system and frequency hopping method of the present disclosure, A mesh topology may be used in an office environment or setting. In one embodiment, a router node may include two RF transceivers. More than two RF transceivers may be used. The router node may use the frequency hopping method of the present disclosure to handle multiple streams of RF communications as described above. Office area can be divided into multiple office areas 1002, 1004, 1006, 1008. In one embodiment, each office area uses one router system 1010, 1012, 1014, and also connects with sensors and other peripheral devices (1016a, 1016b; 1018a, 1018b; 1020a, 1020b respectively). All routers 1010, 1012, 1014 in one embodiment connect into a mesh backbone 1022, 1024a, 1024b.

Figure 11:
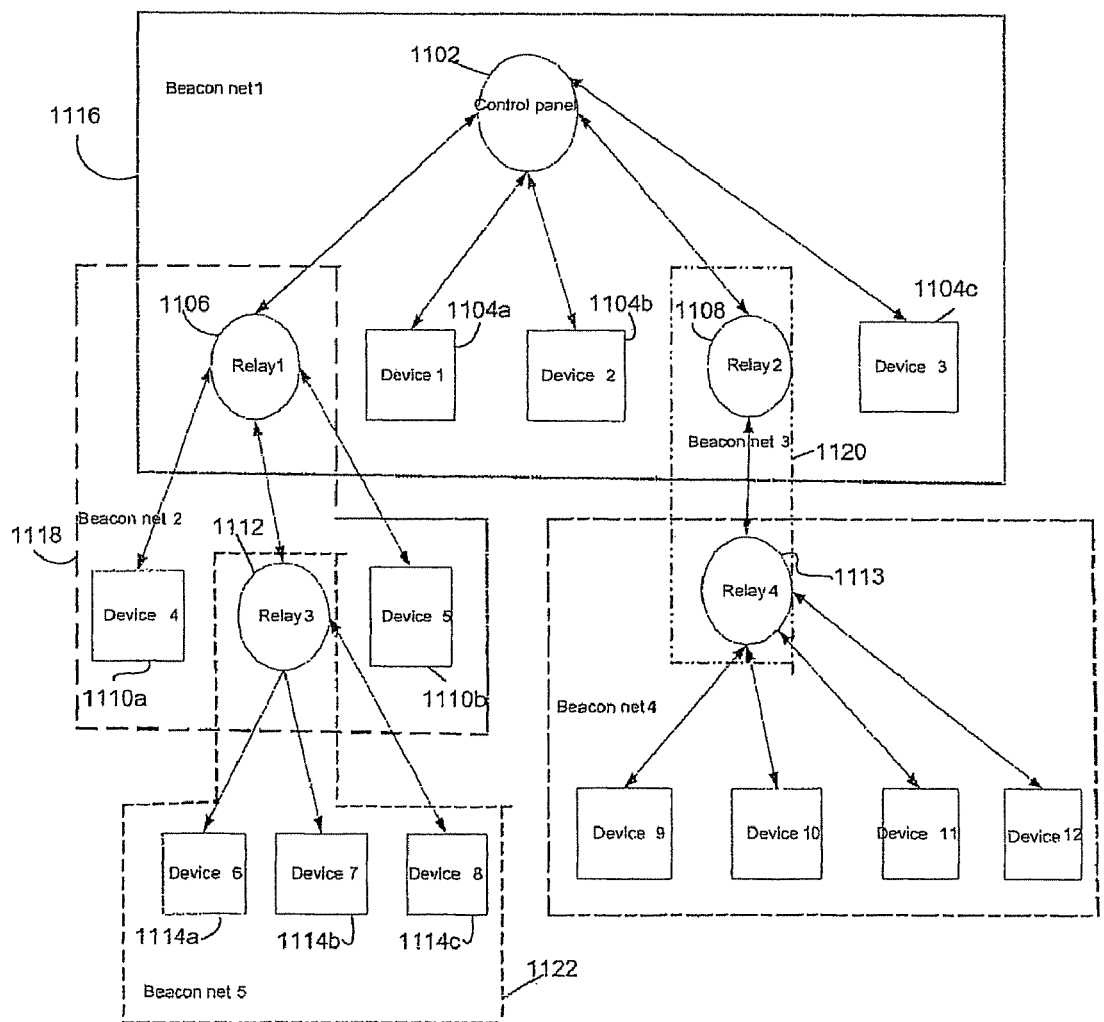
FIG. 11 illustrates a wireless network having a tree structure in one embodiment of the present disclosure.

FIG. 11 illustrates in detail a tree topology with relay nodes. A control panel 1102 is directly connected with devices 1104a-1104c and relay 1106, 1108. Each relay (e.g., 1106) may connect with another set of peripheral devices (e.g., 1110a, 1110b), one or more parent relays and/or child relays (e.g., 1112). Peripheral devices (e.g., 1114a-1114c) are end devices, which only communicate with its parent relay (e.g., 1112), for example. A relay can also have combined functions as both a relay and peripheral device. In addition to concurrent FHSS algorithm described above, another method of parallel control using master beacon may be applied at the control panel 1102, and all relay nodes. A control panel 1102 sends Master beacon to its devices, including directly connected relays. This disclosure refers to this as Beacon net 1 (1116). Each relay and its directly connected devices will fowl Beacon net 2 (1118), Beacon net 3 (1120), and so on. In one embodiment, each relay sends Master beacon to its devices with different beacon intervals and scheduling.

Figure 12:
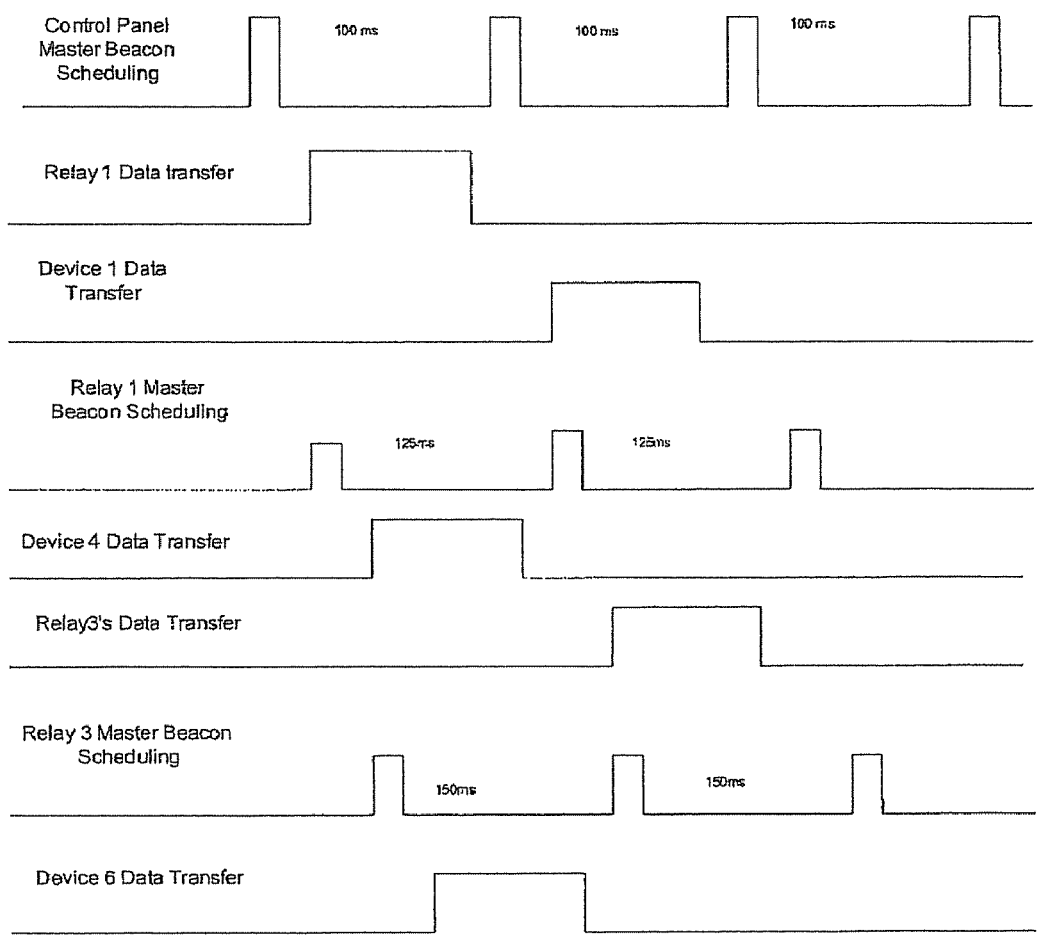
FIG. 12 illustrates an example of beacon scheduling for each beacon net.

FIG. 12 shows beacon scheduling for each beacon net in one embodiment of the present disclosure. Data from Device 6 (1114a) will be eventually forwarded to a control panel 102 through Relay 3 (1112) and Relay 1 (1106). The beacon interval for each beacon net can be adjusted based on the network performance. Each relay node acts as a master device to its child devices by sending out Master Beacon Frame periodically. Relay nodes at each tree level have different Master Beacon Frame schedule time. For a tree of 3 levels in FIG. 11, Master Beacon Frame may be scheduled by each relay nodes with selected time apart, for example, 25 ms apart. For example:

Root master device 1102: Master beacon Frame is scheduled at time t;

Relay node 1 1106: Master beacon Frame is scheduled at time t+25 ms;

Relay node 2 1108: Master beacon Frame is scheduled at time t+50 ms;

Relay node 3 1112 and Relay node 4 1113: Master beacon Frame is scheduled at time t+75 ins. In such a manner, there will be multiple parallel beacon nets running in the network.

The method of parallel dual transceivers or multiple transceivers can also be used to support a multiple frequency band network, where some devices are operational on one frequency band, and other devices are operational on another different frequency bands.

Figure 13:
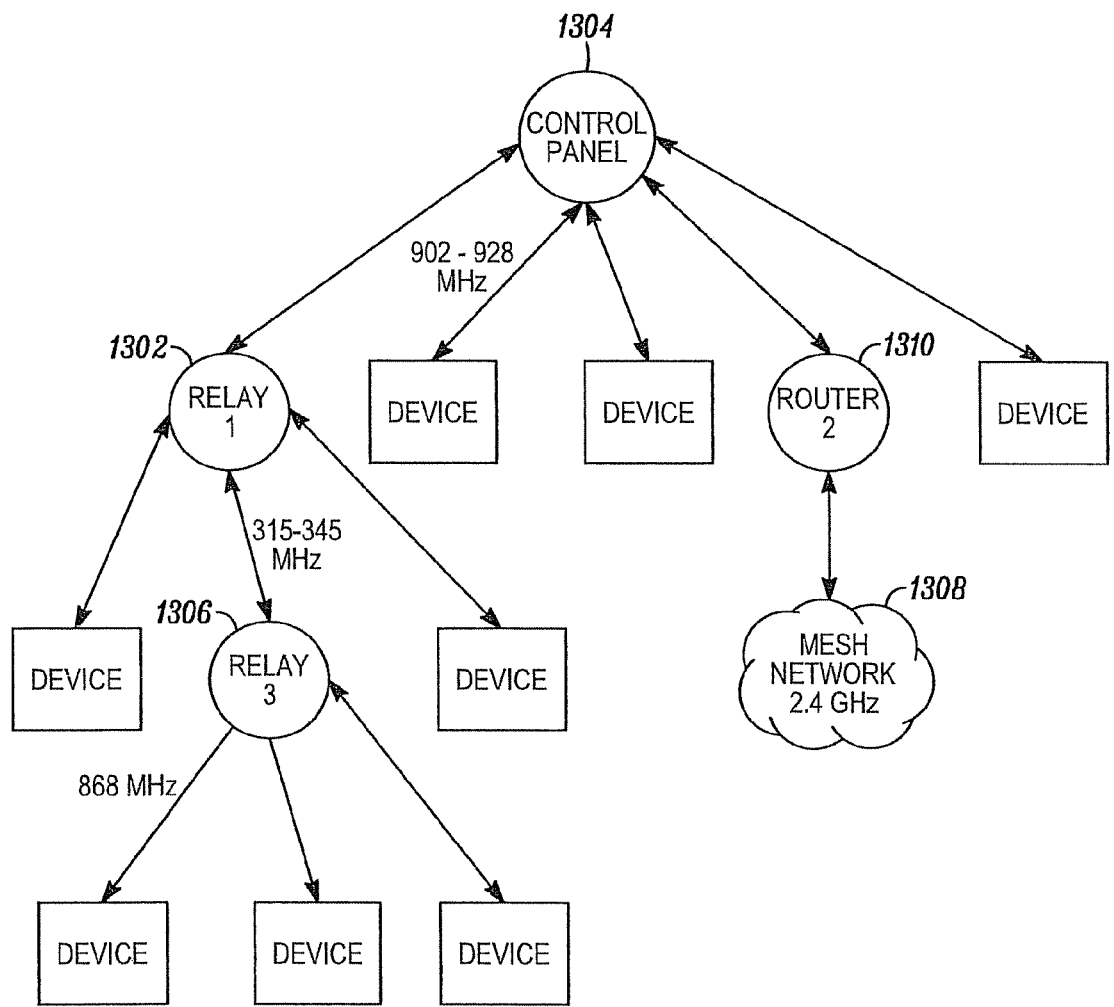
FIG. 13 illustrates frequency diversity in one embodiment of the present disclosure.

FIG. 13 illustrates frequency channel allocation and diversity. As shown in the figure, a relay may have two-way communications with one or more other relays. In the case where a relay has two-way communications with two or more relays, there may be at least two different frequency channels used for each relay. For example, Relay 1 (1302) may use 902 MHz to communicate with a control panel 1304 while using another frequency to communicate with Relay 3 (1306). An advantage of a tree structure topology is that different frequency bands may be possibly used in communicating. For example, beacon net 1 (FIG. 11, 1116) may use 902-928 MHz band. Beacon net 5 (FIG. 11, 1122) may use 315-345 MHz frequency band, or at 2.4 GHz bands.

Referring back to FIG. 13, Zigbee mesh network 1309 may be connected to one of Relays (e.g., 1310). Such a mesh network may be a single application network, for example, lighting control or temperature control. Data from mesh network 1308 is forwarded to the control panel 1304 through router 2 1310, for example.

Relays may be connected in a mesh in one embodiment. The relays now may function as routers in the mesh topology.

Figure 14:
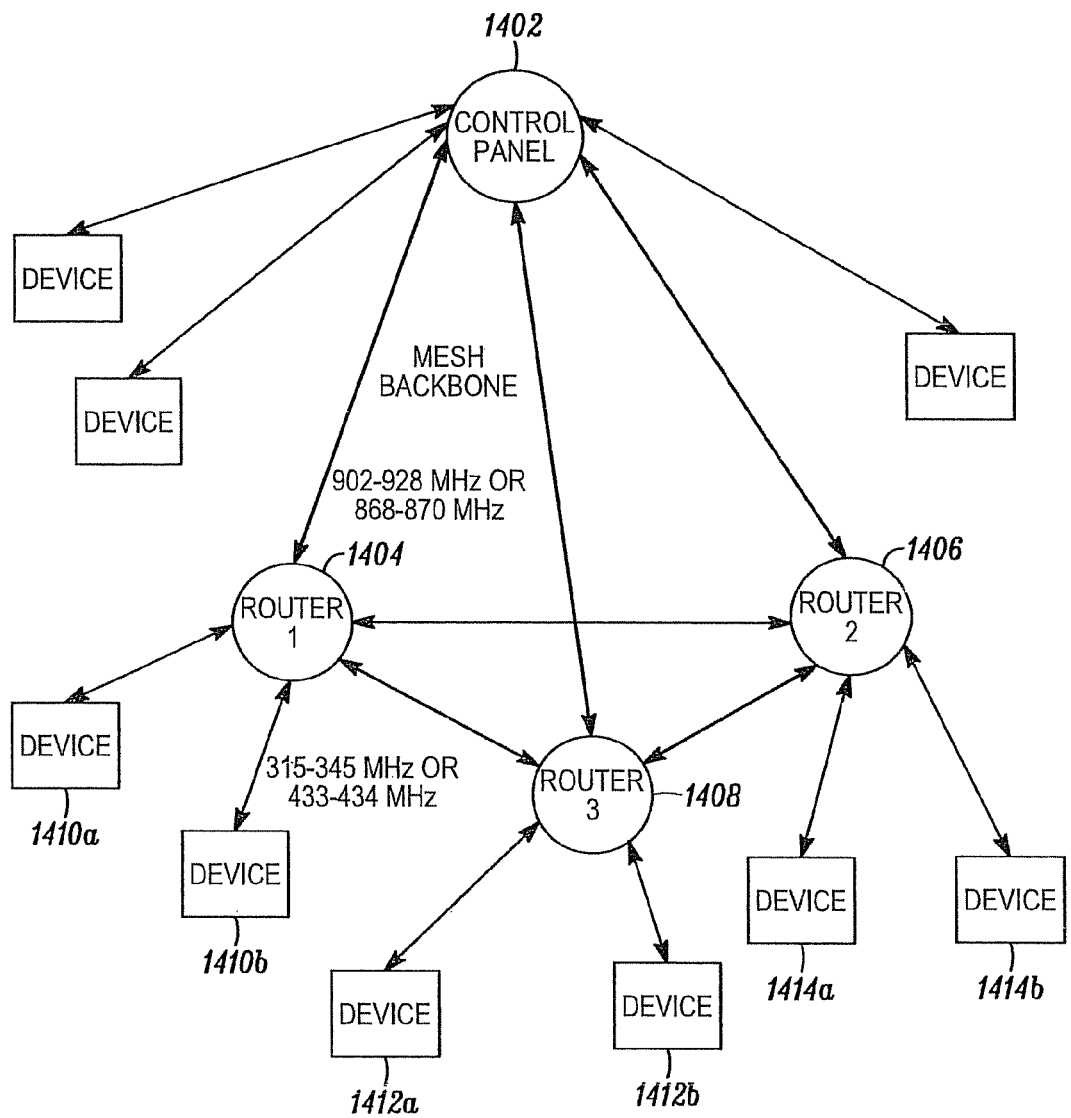
FIG. 14 illustrates mesh backbone topology in one embodiment of the present disclosure.

FIG. 14 illustrates an example of a mesh topology structure. A control panel 1402 and all the routers 1404-1408 are fully connected with each other, creating a mesh network. Peripheral devices (e.g., 1410a-1410b, 1412a-1412b, 1414a-1414b) are only connected to one parent router (e.g., 1404, 1406, 1408, respectively). In this embodiment, there is no direct communications between two peripheral devices. Rather, routers provide routing functionalities. In a commercial environment, for example, this type of topology can be very useful. Using multi-hops link for peripheral devices, which have long distance with a control panel 1402, the method of the present disclosure may extend the network coverage. A mesh network can be considered as a backbone network, which operates on either 902-928 MHz in United States or 868-870 MHz in Europe. This way, the backbone network may use high transmit power to cover a large area. Peripheral devices can use 315-345 MHz (United States) or 433-434 MHz (Europe) to communicate with parent routers. All the devices and routers may use the same frequency band 902-928 MHz or 315-345 MHz or other European bands.

When routers need to forward an alarm message or trigger an event upwards, a router may forward it to a control panel or the neighbor router if its alarm interval is available within the current superframe. Otherwise, it may forward the alarm and/or event trigger message to the control panel or relays using the flow interval within the nearest superframe. Each router may be designed to manage a number of peripheral devices, for instance, up to 250 peripheral devices, or any other number designed to provide best or optimal system performance.

The GWP hardware of the present disclosure as described above in one embodiment has at least two RF transceiver chipsets and one microprocessor, enabled to provide parallel processing in a relay node to support a tree or mesh topologies.

In one embodiment, there are two types of communication streams in a tree topology: upstream and downstream. Upstream refers to the communication between a relay node with its parent node. Downstream communication takes place between a relay node and its child devices. The child devices may be end devices. In one embodiment, the method and system of the present disclosure may use two RF transceiver chipsets in parallel. One chipset handles upstream communication (transmission and receive) with the parent device. Another chipset handles downstream communication. In one embodiment, a microprocessor is responsible for handling data from both transceivers through interrupt driving and real-time multitasking schemes.

Referring to FIG. 1, the hardware block diagram shown in FIG. 1 may be used as a system supporting relay node in a tree topology in one embodiment of the present disclosure. Two interrupt lines are provided to the microprocessor (for example, MSP430) 102. In one embodiment, a microprocessor 102 is responsible for generating two schedules of superframes: upstream superframe scheduling and downstream superframe scheduling. In one embodiment, as long as there is enough CPU power to handle data, two superframe time periods are overlapped as much as possible in order to reduce latency for end devices.

In mesh backbone topology, one router communicates with multiple other router nodes and multiple child devices. The node structure shown in FIG. 1 may also be used as a router node in a mesh backbone topology. In this scenario, all the communications among routers and control panel device may be considered as upstream communications. All the communications among a router and its child devices are downstream communications. For upstream communications, a microprocessor in one router in level 1 will create one superframe scheduling for all other the routers in level 2. And routers in level 2 will create one superframe scheduling for the routers in level 3. Between router 1 and router 2, same level communication occurs, which uses the 3rd superframe scheduling.

In FIG. 14, router 1 and router 2 are level 1 router nodes. Router 3 is considered as a level 2 router node. This way, every relay or router node only needs to generate maximum of two superframe schedules: downstream superframe; and same level superframe. Each node need only respond to one superframe scheduling from a parent device. Router 3 will respond to the superframes from either router 1 or router 2, which generate the same downstream superframe scheduling.

Wireless communication system using 902-928 MHz ISM band can support longer communication range since the FCC allows the maximum 1 W transmit power on this band. A novel frequency hopping method used in conjunction with 1 W transmit power permits the high transmit power to be evenly distributed among a set of frequency channels. New system architecture between a control panel and sensors or other type of peripheral devices overcomes the limitations of a star topology. This type of system is referred to as a repeater, relay or router system depending on its functions. The new system can support tree or mesh topology, which provides multiple RF links, extended range and larger geographical area. For example, multiple buildings or multiple floors can be covered by one installation, which may include one control panel, a number of sensors and a number of relay systems. Two parallel transceivers to handle multiple communication streams were also described above.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for selecting and scheduling frequency channel hopping for two or more transceivers, comprising the following steps:

establishing two or more transceivers in one communication system;

storing a plurality of communication requests for said two or more transceivers in a communication request queue;

storing a common hop table having information associated with a plurality of channels for said two or more transceivers;

obtaining a first communication request to service from the communication request queue;

identifying a first transceiver to use for the first communication request;

using the common hop table to determine an available channel to use for the first transceiver;

while the first transceiver is performing communication associated with the first communication request, obtaining a second communication request to serve from the communication request queue; and identifying a second transceiver to use for the second communication request; and using the common hop table to determine an available channel to use for the second transceiver, wherein said two or more transceivers can be served concurrently and each channel in the common hop table can be shared concurrently within a period time among the said two or more transceivers and said two or more transceivers perform frequency hopping in parallel among the plurality of channels specified in the common hop table.

2. The method of claim 1, wherein each channel in the common hop table can be shared concurrently among the said two or more transceivers when channel's usage within the period time does not exceed a dwell time.

3. The method of claim 1, wherein the step of using the common hop table to determine an available channel to use for the transceiver includes:
- selecting randomly a channel from the plurality of channels specified in the common hop table;
- determining when the selected channel is busy, and when the selected channel is busy, repeating the selecting step and the determining step to select a next channel that is available;
- setting the selected channel as busy in the common hop table; and
- allowing the transceiver to perform communications on the selected channel and resetting the selected channel when the transceiver completes communicating on the selected channel.

4. The method of claim 3, wherein the step of allowing the transceiver to perform communications on the selected channel and resetting the selected channel when the transceiver completes communicating on the selected channel includes:
- allowing the transceiver to perform communications on the selected channel; recording channel usage; and
- allowing the transceiver to release the selected channel when the transceiver completes communicating on the selected channel or when a dwell time for the selected channel expires.

5. The method of claim 1, further including:
- establishing a single processor, wherein the steps of storing, obtaining, identifying and using are performed by the single processor.

6. The method of claim 1, wherein the common hop table includes at least two timers associated with each of the plurality of channels specified in the common hop table.

7. The method of claim 1, wherein said steps are performed for communicating within a security system comprising at least alarm system control panel and one or more peripheral devices.

8. The method of claim 1, wherein the first transceiver is used for upstreaming communication and the second transceiver is used for downstreaming communication.

9. A method for selecting and scheduling frequency channel hopping for two or more transceivers, comprising the following steps:
- establishing at least a first transceiver and a second transceiver for communicating concurrently;
- establishing a single hop table for the first transceiver and the second transceiver, the single hop table tracking information associated with a plurality of channels;
- selecting randomly an available channel from the single hop table;
- using the selected available channel for allowed time duration; and
- repeating the steps of selecting and using until data transfer is completed for current communication request,
- wherein the steps of selecting, using, and repeating are performed for communication requests on the first transceiver and the second transceiver concurrently.

10. The method of claim 9, wherein the first transceiver is selected for communication requests that are upstream and the second transceiver is selected for communication requests that are downstream.

11. The method of claim 9, wherein the steps are performed for communicating within a security system comprising at least alarm system control panel and one or more peripheral devices.

12. The method of claim 9, wherein the steps are performed in one or more relay devices connected to a security system control panel, alarm system control panel, one or more devices, or combinations thereof, in a tree topology network.

13. The method of claim 9, wherein the steps are performed in one or more router devices connected to a security system control panel, alarm system control panel, one or more devices, or combinations thereof, in a mesh topology network.

14. The method of claim of claim 13, wherein all of said one or more router devices in the mesh topology network communicate directly with a control device.

15. The method of claim 9, wherein the first transceiver and the second transceiver perform multiple streams of communication.

16. A system for selecting and scheduling frequency channel hopping for two or more transceivers, comprising:
- at least two radio frequency transceivers;
- a processor connected to said at least two radio frequency transceivers; and
- a common hop table stored at the processor, the common hop table including at least information associated with a plurality of channels,
- the processor operable to control said at least two radio frequency transceivers and to process two or more communication requests concurrently for said at least two radio frequency transceivers by selecting randomly an available channel from the common hop table for a first transceiver of said at least two radio frequency transceivers and while allowing the first transceiver to perform communications, selecting randomly an available channel from the common hop table for a second transceiver of said at least two radio frequency transceivers, and allowing said second transceiver to perform communications,
- wherein said at least two radio frequency transceivers can be served concurrently and each channel in the common hop table can be shared concurrently within a period time among said at least two radio frequency transceivers when a channel's usage within the period time does not exceed a dwell time, and wherein said at least two radio frequency transceivers perform frequency hopping in parallel among the plurality of channels specified in the common hop table.

17. The system of claim 16, wherein the common hop table stores at least two timers associated with each of the plurality of channels.

18. The system of claim 16, wherein each of said at least two radio frequency transceivers is operable to release a channel upon completion of communications or when an allotted time for communicating on the channel has expired.

19. The system of claim 16, further including a communication request queue for storing a plurality of communication requests from said at least two radio frequency transceivers.

20. The system of claim 19, wherein the processor stores communication requests for said at least two radio frequency transceivers in the communication request queue.

21. The system of claim 16, wherein the system is used in a security system to communicate between a control panel and one or more peripheral devices of the security system.

22. The system of claim 16, wherein the system is included in a security system control panel.

23. The system of claim 16, wherein the system is used as a relay node in a security system for providing communications between a control panel of the security system and a plurality of sensors and peripheral devices in the security system.

24. The system of claim 16, wherein the system is used as a router node in a security system for providing communications between a control panel of the security system and a plurality of sensors and peripheral devices in the security system.

25. A program storage device readable by a machine, tangibly embodying a program of instructions executable by the machine to perform a method for selecting and scheduling frequency channel hopping for two or more transceivers, comprising:

establishing two or more transceivers in one communication system;

storing a plurality of communication requests for said two or more transceivers in a communication request queue;

storing a common hop table having information associated with a plurality of channels for said two or more transceivers;

obtaining a first communication request to service from the communication request queue;

identifying a first transceiver to use for the first communication request;

using the common hop table to determine an available channel to use for the first transceiver;

while the first transceiver is performing communication associated with the first communication request, obtaining a second communication request to service from the communication request queue; and identifying a second transceiver to use for the second communication request; and using the common hop table to determine an available channel to use for the second transceiver, wherein said two or more transceivers can be served concurrently and each channel in the common hop table can be shared concurrently within a period time among the said two or more transceivers and said two or more transceivers perform frequency hopping in parallel among the plurality of channels specified in the common hop table.

* * * * *